United States Patent [19]

McDonald et al.

[11] 4,047,755
[45] Sept. 13, 1977

[54] RESTRAINING MEANS FOR AN INFANT CAR SEAT

[75] Inventors: Quentin H. McDonald, Scarsdale, N.Y.; Richard L. Panicci, Hanover, Mass.

[73] Assignee: Quentin H. McDonald, Scarsdale, N.Y.

[21] Appl. No.: 668,969

[22] Filed: Mar. 22, 1976

[51] Int. Cl.² ............................................. B60R 21/10
[52] U.S. Cl. ..................................... 297/216; 297/384
[58] Field of Search .............. 297/359, 390, 377, 216, 297/384; 248/456, 323; 5/74; 403/85

[56] References Cited

U.S. PATENT DOCUMENTS

| | | | |
|---|---|---|---|
| 2,812,013 | 11/1957 | Kreciglowa | 297/359 |
| 3,563,600 | 2/1971 | Converse | 297/390 |
| 3,791,651 | 2/1974 | Barnum | 248/456 X |
| 3,858,936 | 1/1975 | Gerkin | 297/377 |
| 3,912,214 | 10/1975 | Karass | 248/323 |
| 3,948,556 | 4/1976 | Hyde | 297/390 |

FOREIGN PATENT DOCUMENTS

| | | | |
|---|---|---|---|
| 247,592 | 10/1963 | Australia | 297/377 |
| 75,991 | 7/1961 | France | 297/377 |
| 13,596 | 6/1908 | United Kingdom | 5/74 |

Primary Examiner—James T. McCall
Attorney, Agent, or Firm—Kenyon & Kenyon, Reilly, Carr & Chapin

[57] ABSTRACT

The bracket or brackets on the rear of the car seat in which the positioning bar is held are provided with slots of contoured shape to prevent accidental shifting of the seat from one position to another during a crash when the car seat is in a rear facing position. The shape of the slots is such that a corner is formed around which the bar would have to move in order to pass from a lowermost slot into the uppermost position.

15 Claims, 4 Drawing Figures

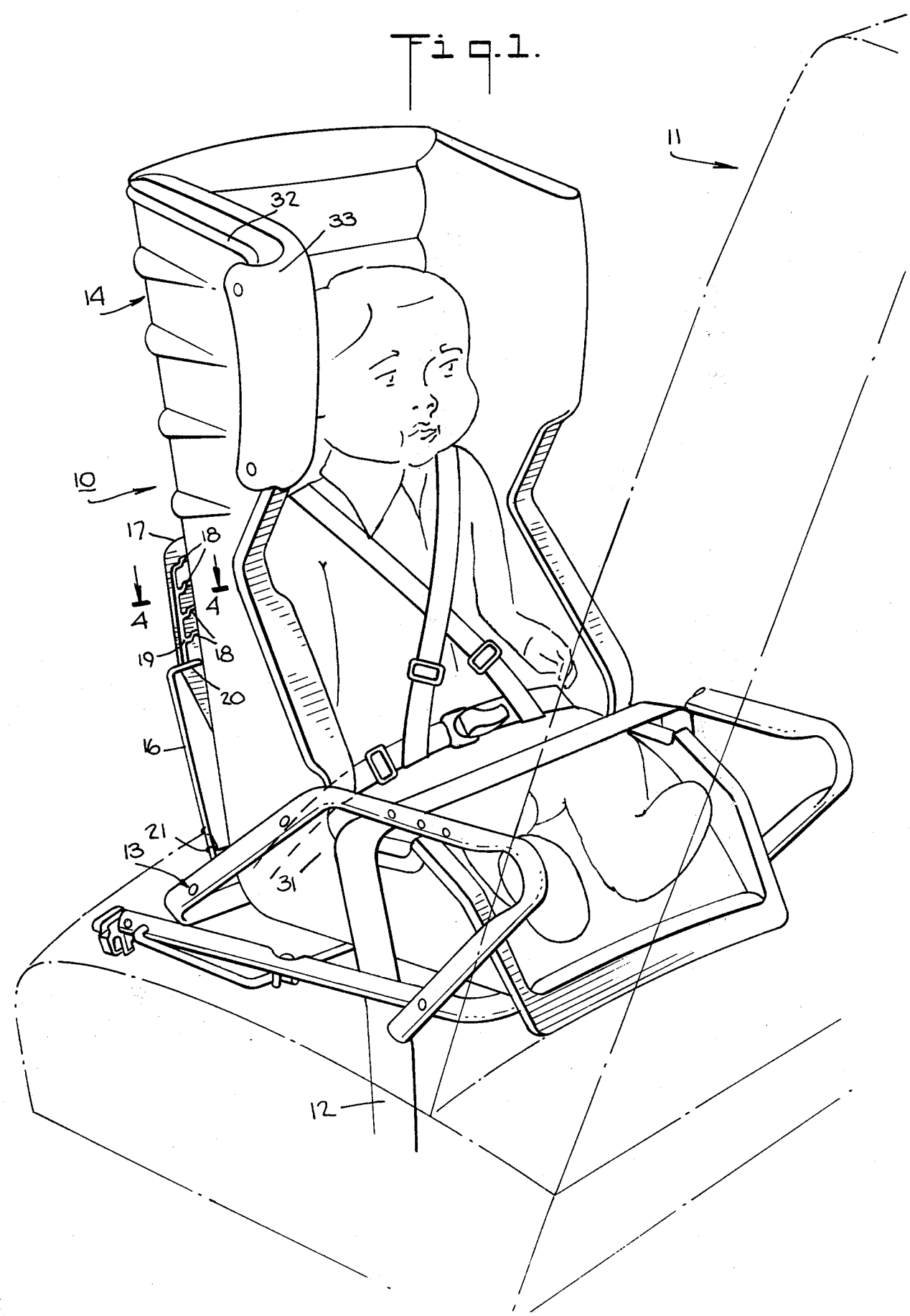

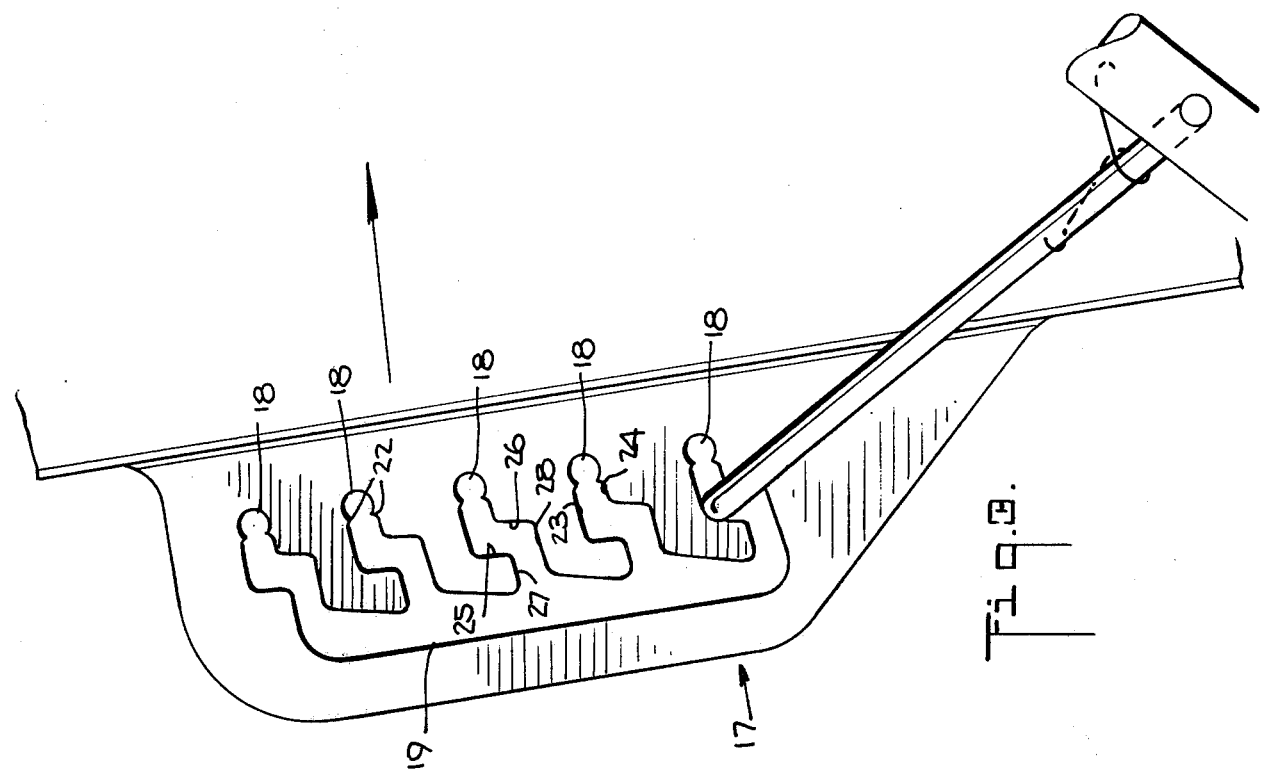
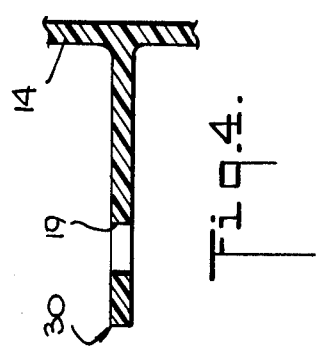
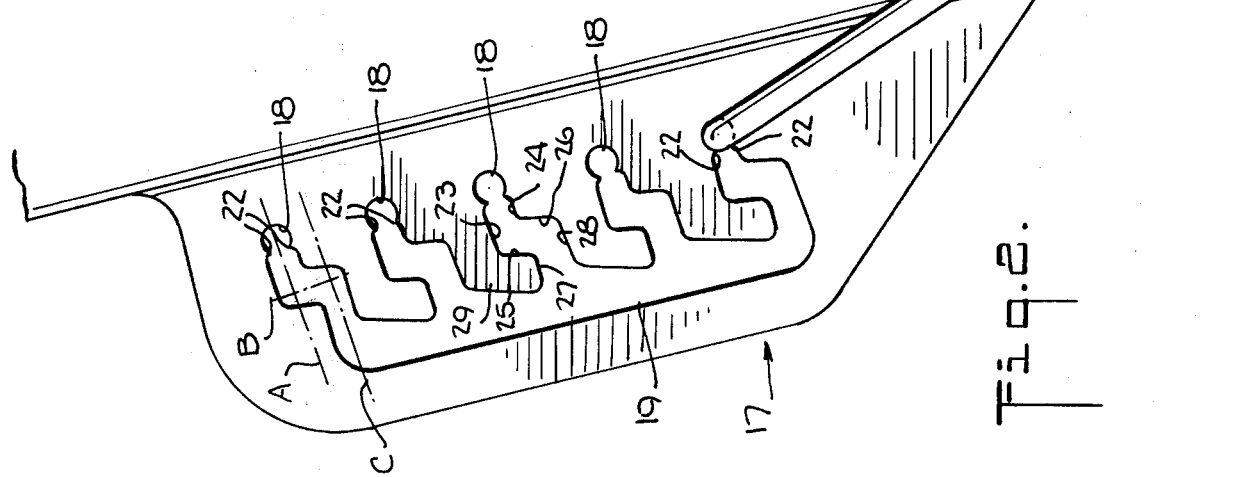

RESTRAINING MEANS FOR AN INFANT CAR SEAT

This invention relates to a restraining means for an infant car seat.

As is known, various types of car seats have been provided for seating of infants or other small children in an automobile or other vehicle. In some instances, the car seats have simply been placed on the seat of the vehicle and held in place by means of a seat belt. In other instances, for example, as described in U.S. Pat. No. 3,649,074, car seats have been provided with a frame which carries an extension bar which wedges between a seat cushion and a backrest of a vehicle seat to enhance securement by a seat belt. It has also been known to provide car seats, such as described in the above patent, with a safety shield which is mounted on the car seat in front of the occupant and which carries a clamping means for clamping to the seat belt in order to hold the car seat in place against both longitudinal and lateral crash impacts.

It has also been proposed to place car seats in a rear-facing position so as to more readily protect an occupant. However, for a car seat having a chair pivotally mounted in a frame and held in one of a plurality of positions by a bar or hoop which is snapped into one of a number of positioning slots on one or more brackets on the rear of the chair, for example as described in U.S. Pat. No. 3,649,074, the chair of the seat may accidentally move from one position to another during a crash if placed in a rear-facing position. For example, it has been found in rear-facing sled tests that, if the chair is put into a partly reclining position, the hoop may pop out of the positioning slot in a crash situation and proceed into the fully reclining positioning slot at the height of the crash. This means that the chair would not stay in the selected position in a crash unless that position were the fully reclining one. While this may not be dangerous in itself, there may well be an undesireable movement.

Accordingly, it is an object of the invention to reduce the possibility of accidental pivoting of a chair within a frame of a car seat.

It is another object of the invention to limit the motion of a pivotally mounted seat of an infant car seat.

It is another object of the invention to provide a simple means of limiting pivoting motion of a rear facing chair of a car seat.

Briefly, the invention is directed to a seat having a frame, a chair pivotally mounted in the frame and a means for holding the chair in a selective one of a plurality of positions within the frame. This means includes at least one bar which is movably mounted on the frame and a means on the rear of the chair which includes a plurality of spaced positioning slots for receiving the bar. At least some of these slots have means for releaseably holding the bar at the end. For example, these means are constituted by a constriction formed by a pair of facing studs or the like. In accordance with the invention, each positioning slot has portions which define a corner to limit movement of the bar from the end after passage from the holding means.

In one embodiment, the means on the rear of the backrest portion of the seat is in the form of a bracket having an aperture which defines the positioning slots. In addition, the bracket includes a common slot which communicates the positioning slots with each other. In addition, the bar is in the form of a U-shaped bar or hoop which has a pair of ends pivotally mounted on the frame and a lateral portion passing through the brackets within the aperture. The aperture is closed so that the bar may be retained at all times within the bracket during use.

The positioning slots within the bracket are disposed in a spaced apart manner and are substantially parallel to each other. Each of these slots is basically of identical contour, for example a serpentine shape, to define a corner or similar shape which functions to preclude or limit motion of the bar from the slot after passing through the constriction. To this end, two portions of the slot are angularly disposed to each other to define the corner.

When used as a car seat, the frame is placed on a vehicle seat with the chair in a rear-facing position and with the positioning bar, for example in one of the partly reclining positions with an occupant therein. In addition, a seat or lap belt is threaded through the car seat to hold the car seat in place. Should a crash situation occur which imposes sufficient inertial forces on the seat to pop the bar past the constriction in the positioning slot, the bar will move rearwardly until reaching the corner of the slot. At that point, the bar is intended to come to rest and be retained in the slot. After the crash, the bar can be returned to its initial position or can be moved to another positioning slot.

These and other objects and advantages of the invention will become more apparent from the following detailed description and appended claims taken in conjunction with the accompanying drawings in which:

FIG. 1 illustrates a prospective view of a car seat embodying the invention;

FIG. 2 illustrates a side view of a bracket with a bar in the lowermost, upright position prior to a crash;

FIG. 3 illustrates a view similar to FIG. 2 during the occurrence of an inertial force which pops the bar out of a constricted portion of a positioning slot; and FIG. 4 illustrates a top view on line 4—4 of FIG. 1 of a bracket in accordance with the invention.

Referring to FIG. 1, the car seat 10 for seating an occupant such as a small child of six to eight months and under is placed on a vehicle seat 11 and is held in place by a conventional seat or lap belt 12. The car seat 10 is similar to that as described in U.S. Pat. No. 3,649,074 and is constructed with a frame 13 and a pivotally mounted bucket-like chair 14. As shown, the chair 14 includes a backrest portion and a seat portion which are rigidly connected to each other in a one-piece arrangement.

In order to hold the chair 14 in a selective one of a plurality of positions within the frame 13, a suitable means is provided to the rear of the car seat. As shown, this means includes at least one bar or hoop 16 of U-shape which is pivotally mounted at the ends of the frame 13 as well as a pair of brackets or racks 17 on the rear of the chair 14. Each bracket 17 is provided with an aperture which defines a plurality of spaced-apart positioning slots 18 and a communicating common slot 19 which interconnects the positioning slots 18 to each other. The bar 16 has a lateral portion 20 which passes through the apertures of the respective brackets 17 and is biased toward the chair 14 by two springs 21. Each spring 21 has one end anchored in the frame 13 and engages in a leg of the bar 16.

Referring to FIG. 2, the positioning slots 18 of each bracket 17 are of substantially the same shape and are sized to receive the lateral portion 20 of the bar 16. As shown, each positioning slot 18 has a means, such as a constriction formed by studs 22, at one end for releaseably holding the bar 16. As shown, the lowermost positioning slot 18 has the bar 16 releaseably mounted therein so as to hold the chair 14 in an uppermost seating position relative to the frame 13.

As shown, each positioning slot 18 is of serpentine shape and is formed of three portions located along certerlines A, B, C. A first portion along centerline A has two sidewalls 23, 24 on which the studs 22 are formed to hold the bar 16 in position. The second portion along centerline B is approximately perpendicular to the first portion and has two sidewalls 25, 26; one sidewall 25 forms a corner with a sidewall 23 of the first slot portion while the other sidewall 26 forms an angle with a sidewall 24 of the first slot portion. The third portion along centerline C is approximately perpendicular to the second portion and parallel to the first portion. This third portion has sidewalls 27, 28 which are continuations of the sidewalls 23, 25; 24, 26 of the other two portions and communicates directly with the common slot 19 to provide access to and from the shaft 19. As shown, the positioning slots 18 define finger-like projections 29 within the aperture of the bracket 17. These projections 29 act as abutments opposite the first slot portions (A).

The positioning slots 18 may be identical and may be angularly disposed with respect to a horizontal plane so as to provide positions from reclining to upright.

Referring to FIG. 4, each bracket or rack 17 is in the form of a flange 30 which is integral with the chair 14 and extends outwardly of the rear of the chair 14. The flange 30 contains the shaped aperture which defines the various serpentine positioning slots 18 and communicating slot 19. Alternatively, each bracket or rack 17 may be separately formed from the chair 14. In such a case, the bracket may have a base on the flange by means of which the bracket can be secured to the chair as by bolts, adhesives and the like.

The chair 14, as shown in FIG. 1, is provided with a pair of lap belt openings 31 in the lower sides. These openings 31 provide a space for the vehicle lap belt 12 to feed through in order to anchor the car seat 10 when used in the rear-facing position as shown. The chair 14 is also provided with side wings 32 and a snap-in cushion 33 for the protection and comfort of the occupant.

Referring to FIG. 1, when in use, the car seat 10 is placed in a rear-facing position relative to the vehicle seat 11 and vehicle (not shown). In addition, the chair 14 is mounted in any one of the positions, provided by the positioning slots 18 in the brackets 17. If the bar 16 is inserted in the lowermost positioning slot 18 and pushed past the studs 22 to be locked in place at the end of the slot, the chair 14 is in an upright position. Use of each succeeding slot above the lowermost places the chair in a more reclined position. Should the vehicle thereafter be involved in a crash during which an inertial force of sufficient magnitude is generated to propel the lateral portion 20 of the bar 16 past each set of studs 22, the bar 16 will become displaced relative to each bracket 17 to the extent that the bar 16 moves against the wall 25 of the slot on an abutment 29. However, the bar 16 should remain wedged in the corner defined by the walls 23, 25. That is, when the seat 10 is in the rear-facing position in a car and there is a frontal crash, the chair 14 does not pivot forwardly during the crash, instead the forces of a frontal crash cause the chair 14 to want to pivot counter-clockwise as viewed. But until this actually takes place, the inertial forces cause the lateral portion 20 of the bar 16 to move to the rear of the slot. When the lateral portion 20 of the bar 16 reaches the corner defined by the walls 23 and 25, the bar portion 20 stops, and the forces that make the chair 14 want to pivot counter-clockwise act to lodge the bar 16 in the corner. The bar 16, thus trapped in the positioning slot, serves to maintain the chair 14 in the same relative position with regard to the tubular metal frame 13 that supports the chair 14 as it was at the beginning of the crash.

Upon removal of the inertial force on the chair 14, the weight of the occupant, if properly seated, should cause pivoting of the chair 14 in a counter-clockwise direction as viewed in FIGS. 1 and 3 so that the bar 16 is again pushed past the constricting studs 22 and placed in a locking position within the positioning slot 18. As a result, the bar 16 stays in the same set of slots in which originally positioned. On the other hand, if there is any force that causes the chair 14 to pivot forwardly (clockwise) during a crash when the chair 14 is used in the rear-facing position, that force will cause the bar 16 to press forward (clockwise) to seat further into the slots.

In one embodiment, the positioning slots 18 of the brackets 17 are sized to receive a bar 16 having a lateral portion 20 of a diameter of three-sixteenths of an inch. For example, each slot 18 is formed with a width of 0.203 inches in the first portion (A) containing the constriction studs 22, each of which is 0.015 inches in height. The second and thir portions (B,C) of each slot 18 are of a width of 0.218 inches. The common slot 19 has a clearance of ¼ inch between the outermost wall 34 and the projections 29.

It has been found that the construction of the brackets for the embodiment exemplified above allows the brackets to maintain the chair 14 in a set reclining position in barrier impact crashes at speeds up to 30 MPH in sled tests when the chair is placed in a rear-facing position with 6-month size dummy seated in the chair.

The invention thus provides a car seat which can be restrained in a relatively simple manner in a partly reclining position against accidental falling into a fully reclined position during crashes when the car seat is disposed in a rear-facing position. Further, the restraining means provided by the invention can easily be incorporated into existing car seats or other types of seats for small children or infants in which a positioning bar or the like is mounted in one of a plurality or series of positioning slots.

The car seat may also be provided with a safety shield, for example as described in U.S. patent application Ser. No. 344,050, filed Mar. 22, 1973 when disposed in a front facing position and particularly when an older child is seated therein.

What is claimed is:

1. In combination,
a frame;
a hoop pivotally mounted on said frame;
a seat pivotally mounted on said frame; and
at least one apertured bracket mounted on said seat, said bracket having a plurality of spaced apart positioning slots for selectively receiving said hoop therein, each said slot including at least two portions angularly disposed relative to each other to define a corner and means in one of said portions for releaseably holding said hoop at one end of said one portion.

2. The combination as set forth in claim 1 which further includes a common slot transverse to and in communication with said spaced apart slots for movement of said hoop between selected ones of said spaced apart slots.

3. The combination as set forth in claim 1 wherein said seat includes a backrest portion and a seat portion for seating a child and said bracket is mounted on a rear surface of said backrest portion.

4. The combination as set forth in claim 3 wherein said hoop is a U-shaped bar having a pair of ends pivotally mounted on said frame and a lateral portion passing through said bracket within one of said slots.

5. The combination as set forth in claim 4 which further includes a vehicle seat and a seat belt wherein said frame is mounted on said vehicle seat with said seat in a rear-facing position and said seat belt envelops said frame to secure said frame on said vehicle seat.

6. In combination a frame, seat pivotally mounted on said frame, at least one aperture bracket mounted on said seat and a bar pivotally mounted on said frame and disposed within said bracket, said bracket having a plurality of serpentine slots therein disposed in spaced relation to each other and a common slot communicating said serpentine slots with each other, said bar being disposed within a selective one of said serpentine slots to position said seat in one of a plurality of positions relative to said frame, each said serpentine slot having at least two portions angularly disposed relative to each other to define a corner and means in one of said portions for releaseably holding said bar at one end of said one portion.

7. In combination with a pivotally mounted seat and a bar for securing said seat in one of a plurality of selected positions;
at least one bracket mounted on a rear surface of said seat, said bracket having at least one slot therein receiving said bar, said slot having means at one end for releaseably holding said bar at said end and portions defining a corner spaced from said end to limit movement of said bar from said end after passage through said means.

8. The combination as set forth in claim 7 which includes a pair of said brackets mounted on said seat rear surface.

9. The combination as set forth in claim 8 wherein said bar is U-shaped with a lateral portion passing through said brackets within one of said slots in each bracket.

10. A rack for positioning a bar in one of a plurality of positions comprising a base, a flange portion extending outwardly of said base and a shaped aperture in said flange portion, said aperture defining a plurality of spaced apart serpentine slots and a communicating slot connected to said serpentine slots in common, each said serpentine slot having at least two portions angularly disposed relative to each other to define a corner and a means in one of said portions to define a constriction located between one end of said one portion and said corner.

11. In combination
a seat frame for mounting on a vehicle seat;
a seat pivotally mounted in said frame for seating of a child therein, said seat including a backrest portion; and
means for holding said seat in a selective one of a plurality of positions within said frame, said means including at least one bar movably mounted on said frame and means on the rear of said backrest portion including a plurality of spaced slots for receiving said bar, at least some of said slots having means at one end for releaseably holding said bar at said one end, a first portion extending from said one end, a second portion angularly disposed relative to said first portion to define a corner spaced from said end to limit movement of said bar from said end after passage through said means, and a third portion approximately perpendicular to said second portion and parallel to said first portion.

12. The combination as set forth in claim 11 wherein said means on the rear of said backrest portion is a backrest having an aperture defining said slots and a common slot communicating with said slots and wherein said bar is a U-shaped bar passing through one of said slots in said bracket.

13. In combination,
a frame;
a hoop pivotally mounted on said frame;
a seat pivotally mounted on said frame; and
at least one apertured bracket mounted on said seat, said bracket having a plurality of spaced apart positioning slots for selectively receiving said hoop therein, each said slot including a first portion having means for releaseably holding said bar at one end thereof, a second portion angularly disposed relative to said first portion to define a corner, and a third portion approximately perpendicular to said second portion and parallel to said first portion.

14. In combination a frame, seat pivotally mounted on said frame, at least one apertured bracket mounted on said seat and a bar pivotally mounted on said frame and disposed within said bracket, said bracket having a plurality of serpentine slots therein disposed in spaced relation to each other and a common slot communicating said serpentine slots with each other, said bar being disposed within a selective one of said serpentine slots to position said seat in one of a plurality of positions relative to said frame, each said serpentine slot having a first portion, a second portion angularly disposed relative to said first portion to define a corner, and a third portion approximately perpendicular to said second portion and parallel to said first portion.

15. A rack for positioning a bar in one of a plurality of positions comprising a base, a flange portion extending outwardly of said base and a shaped aperture in said flange portion, said aperture defining a plurality of spaced apart serpentine slots and a communicating slot connected to said serpentine slots in common, each said serpentine slot having a first portion, a second portion angularly disposed relative to said first portion to define a corner, and a third portion approximately perpendicular to said second portion and parallel to said first portion and a means in said first portion to define a constriction located between one end of said first portion and said corner.

* * * * *